(12) United States Patent
Koshy

(10) Patent No.: US 9,233,646 B2
(45) Date of Patent: Jan. 12, 2016

(54) HANDRAIL LOCKING MECHANISM

(71) Applicant: Caterpillar Inc., Peoria, IL (US)

(72) Inventor: Sunil Koshy, Burnie (AU)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/252,939

(22) Filed: Apr. 15, 2014

(65) Prior Publication Data

US 2015/0291099 A1 Oct. 15, 2015

(51) Int. Cl.
*B60R 3/00* (2006.01)
*E02F 9/08* (2006.01)
*E04H 17/14* (2006.01)

(52) U.S. Cl.
CPC .............. *B60R 3/005* (2013.01); *E02F 9/0833* (2013.01); *E04H 17/1421* (2013.01)

(58) Field of Classification Search
CPC ..................................................... Y10S 256/02
USPC .............................................. 256/67, DIG. 2
See application file for complete search history.

(56) References Cited

U.S. PATENT DOCUMENTS

| 79,141 | A | * | 6/1869 | McFarlin | ................. | 256/DIG. 2 |
| 255,673 | A | * | 3/1882 | Robinson | ................. | 256/DIG. 2 |
| 4,240,648 | A | | 12/1980 | Starr | | |
| 4,936,407 | A | | 6/1990 | Brock et al. | | |
| 4,976,455 | A | | 12/1990 | Brammer, Sr. et al. | | |
| 5,749,436 | A | | 5/1998 | Satchwell, III | | |
| 6,045,157 | A | | 4/2000 | Poulin | | |
| 7,195,232 | B2 | | 3/2007 | Marshall et al. | | |
| 2006/0278472 | A1 | * | 12/2006 | Kenton et al. | ................. | 182/113 |
| 2008/0122211 | A1 | | 5/2008 | Kang | | |

FOREIGN PATENT DOCUMENTS

EP 1808335 B1 10/2008
GB 2437735 A 11/2007

* cited by examiner

*Primary Examiner* — Victor MacArthur
(74) *Attorney, Agent, or Firm* — Leonard Stewart

(57) ABSTRACT

A locking mechanism associated with a handrail is provided. A housing having a top open end is configured to accommodate the handrail in an upright position. The housing has a side open end configured to accommodate the handrail in a collapsed position. A pair of slots is provided on opposite side surfaces of the housing. Each of the side surfaces is adjacent to the side open end. A bracket is affixed to any one of the side surface of the housing. A locking member is pivotally coupled to the bracket. The first arm of the locking member is configured to selectively engage with the pair of slots to retain the handrail in the upright position. A second arm of the locking member is configured to selectively release the first arm from the pair of slots to allow the handrail to move from the upright position to the collapsed position.

1 Claim, 5 Drawing Sheets

HANDRAIL LOCKING MECHANISM

TECHNICAL FIELD

The present disclosure relates to a locking mechanism, and more specifically to the locking mechanism associated with a handrail.

BACKGROUND

Handrails are provided on a variety of machines. Some of these handrails have a foldable design, allowing the handrails to move from an upright to a collapsed position. For example, in mining machines or machines used in underground applications, the handrails may need to be folded in order to accommodate the machine in a mine tunnel.

A variety of constructions may be adopted for the folding of the handrails. Some examples include mid folding handrails and low folding handrails wherein a hinge of the handrail is designed to allow the handrail to be folded at a mid section or lower section of the handrail respectively.

U.S. Published Application Number 2008/012221 discloses a handrail of which both ends are stably fixed at a side surface of heavy construction equipment such as, an excavator, etc. The handrail comprises a first section part of which one end is fixed at a front end of the side surface; a second section part of which one end is upright and fixed at an upper surface of the side surface; and a third section part of which both ends are foldable with respect to the other end of each of the first and second section parts. With the above constructions, it is possible to significantly reduce vibrations and loads transferred to the handrail for thereby enhancing durability.

SUMMARY OF THE DISCLOSURE

In one aspect of the present disclosure, a locking mechanism associated with a handrail is provided. The locking mechanism includes a housing. The housing is configured to receive the handrail partially therein. The housing has a top open end configured to accommodate the handrail in an upright position. The housing also has a side open end configured to accommodate the handrail in a collapsed position. A pair of slots is provided on opposite side surfaces of the housing. Each of the side surfaces is adjacent to the side open end. A bracket is affixed to any one of the side surface of the housing. A locking member is pivotally coupled to the bracket. The locking member includes a first arm and a second arm. The first arm is configured to selectively engage with the pair of slots to retain the handrail in the upright position. The second arm is attached to the first arm. The second arm is configured to selectively release the first arm from the pair of slots to allow the handrail to move from the upright position to the collapsed position.

Other features and aspects of this disclosure will be apparent from the following description and the accompanying drawings.

DETAILED DESCRIPTION

Figure 1:
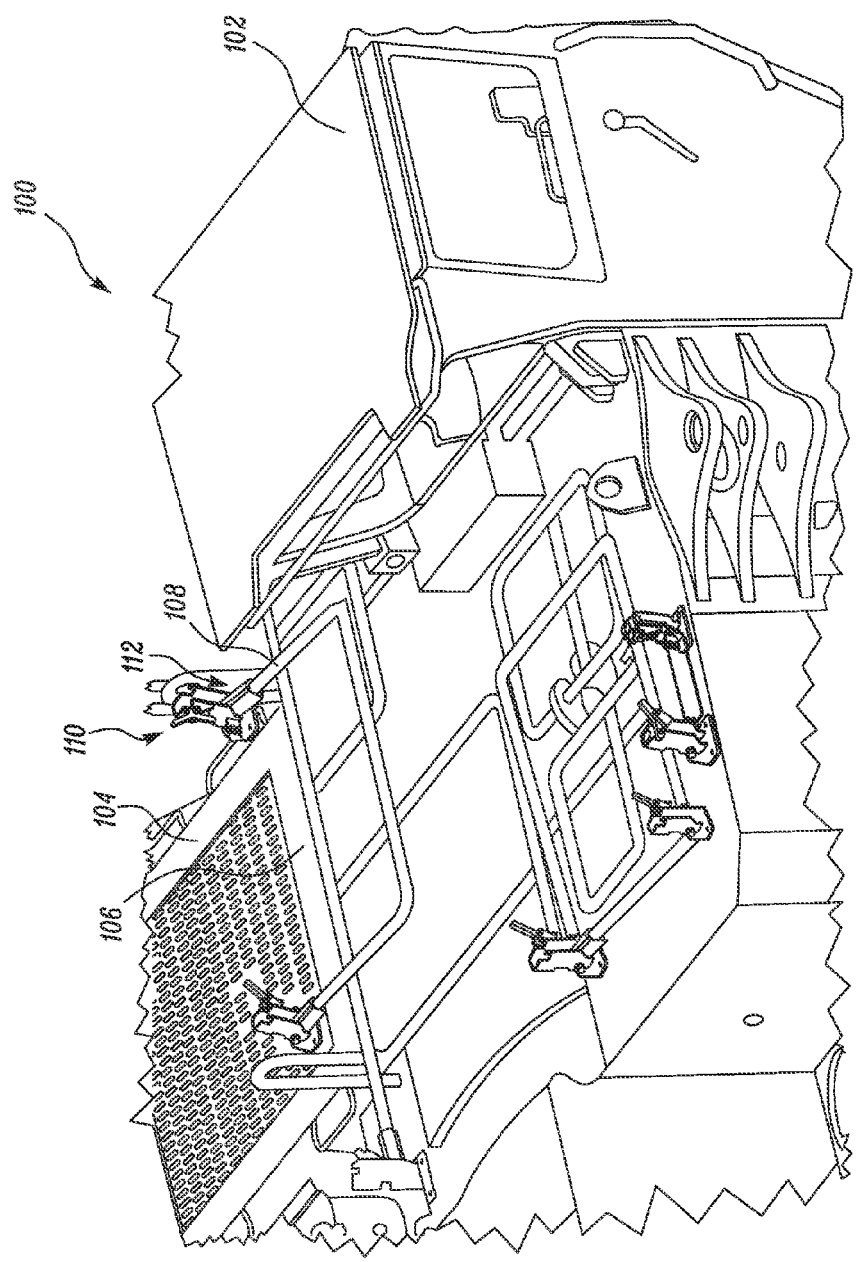
FIG. 1 is a perspective view of a portion of an exemplary machine, according to one embodiment of the present disclosure.

Wherever possible, the same reference numbers will be used throughout the drawings to refer to the same or the like parts. FIG. 1 illustrates a portion of an exemplary machine 100. The machine 100 is embodied as an underground mining loader.

The accompanying figures depict a top portion of the machine 100, proximate to an operator cabin 102. A section of a body 104 of the machine 100 is visible in FIG. 1. A platform 106 is attached to the body 104. Handrails 108 are provided on the platform 106. In the illustrated embodiment, the handrails 108 are provided on either sides of the platform 106. The structure and location of the handrails 108 may vary based on the application. It should be noted that the machine 100 may include any other industrial machine having the handrails 108 attached thereon. For example, the machine 100 may include a large mining truck, an articulated truck, an off-highway truck and so on. In another embodiment, the machine 100 may be one of various types of machinery used in a number of industries such as mining, agriculture, construction, forestry, waste management, and material handling, among others.

The handrails 108 have a foldable design, such that the handrails 108 may either be in an upright position or in a collapsed position. When the handrail 108 is in the upright position, personnel may have access to the platform 106 of the machine 100. In some situations, during mining operations of the machine 100, the handrail 108 may need to be collapsed against the platform 106 in order to allow the machine 100 to be accommodated in mining tunnels and avoid impact therewith.

Figure 2:
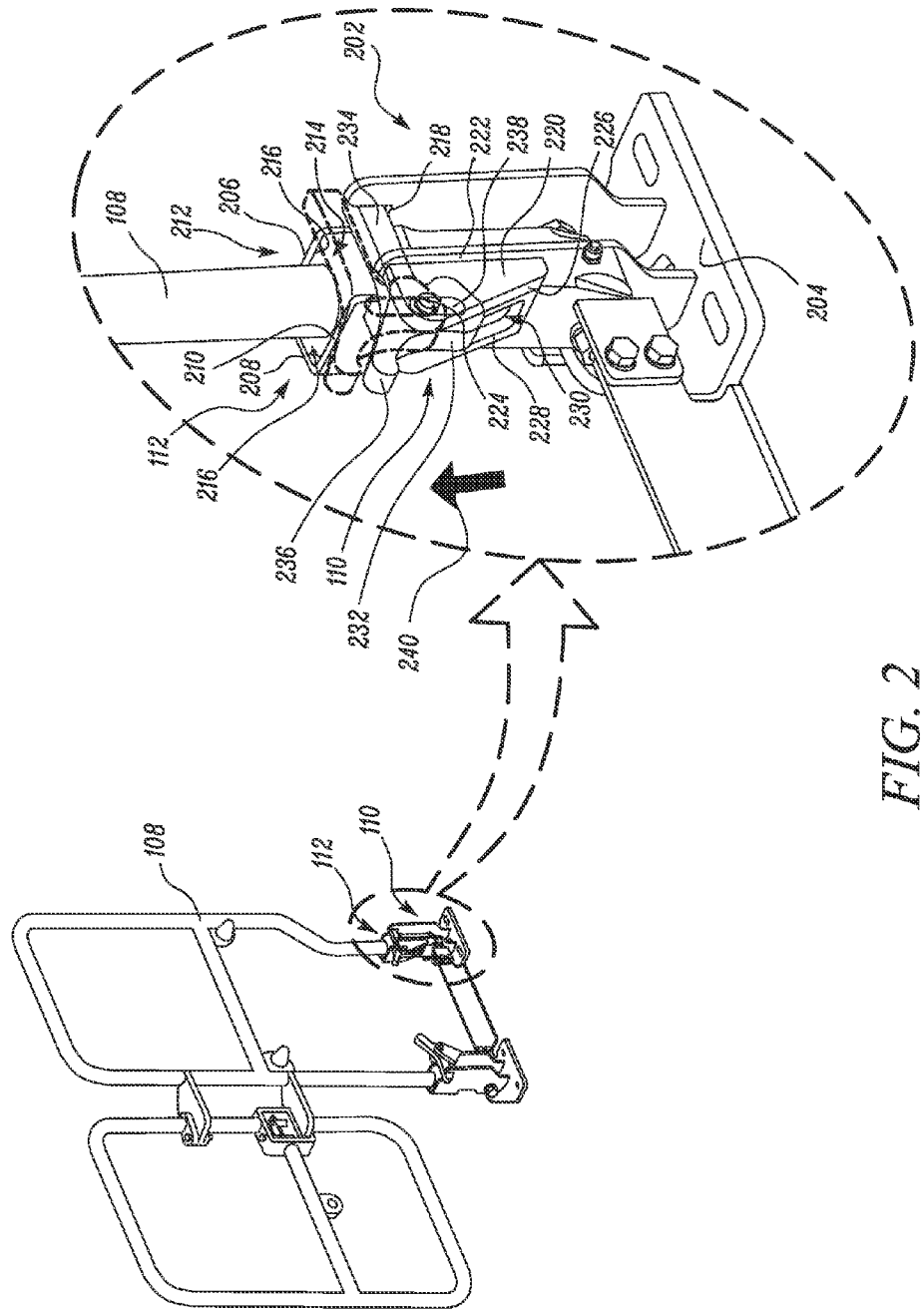
FIG. 2 is a perspective view of a locking mechanism associated with a handrail of the machine showing the handrail in an upright position.

A locking mechanism 110 for the handrail 108 is disclosed herein. The locking mechanism 110 is affixed to a base 112 of the handrail 108. FIG. 2 illustrates an enlarged view of the locking mechanism 110. The locking mechanism 110 includes a housing 202 attached to a base plate 204. The base plate 204 is attached to the platform 106 using known methods, for example, bolting, riveting and so on. The housing 202 includes three side surfaces 206, 208, 210 defining a top open end 212 and a side open end 214 therebetween. The side surfaces 206, 208, 210 of the housing 202 have a planar configuration. An inner face 216 of the housing 202 is shaped to correspond to a shape of the handrail 108, such that the handrail 108 is received between the three side surfaces 206, 208, 210 of the housing 202.

A pair of slots 218 is provided on opposing side surfaces 206, 210, such that each of the slot 218 opens into the top open end 212. In one embodiment, the slots 218 have a rectangular shape. In another embodiment, the slots 218 have a square shape. A bracket 220 is affixed onto an outer face 222 of the side surface 210 of the housing 202. The bracket 220 is positioned proximate to the top open end 212 of the housing 202. A pin 224 is provided through a first and second surface 226, 228 of the bracket 220, such that the pin 224 is substantially parallel to the side surface 210 of the housing 202. The bracket 220 also includes an opening 230 provided therein and surrounding the pin 224, the opening 230 configured to receive a locking member 232.

The locking member 232 includes a first arm 234 and a second arm 236 extending in opposing directions, and a through hole 238 configured to couple with the pin 224 of the bracket 220, such that the locking member 232 is pivotally coupled to the bracket 220. The hole 238 provided on the locking member 232 has an elongated shape. A thickness "T" (shown in FIG. 3) of the first arm 234 corresponds to a depth "D" (shown in FIG. 3) of the slots 218 so that the first arm 234 may be received thereinto. A length "L" (shown in FIG. 3) of the first arm 234 corresponds to a width "W" (shown in FIG. 3) of the housing 202, such that the first arm 234 may be engaged within the slots 218 positioned on the opposing side surfaces 206, 210. The second arm 236 may have a length shorter than that of the first arm 234.

Referring to FIG. 2, when the first arm 234 is engaged within the slots 218, the handrail 108 is retained in the upright position. For collapsing the handrail 108, the personnel may hold onto the second arm 236 of the locking member 232 with his/her hand and pull the second arm 236 in an upward direction 240, causing the first arm 234 to disengage from the slots 218 (as shown by dotted lines in FIG. 2). As the second arm 236 is pulled in the upward direction 240, the pin 224 may slide within the hole 238 allowing the locking member 232 to be raised from an initial engaged position.

Figure 3:
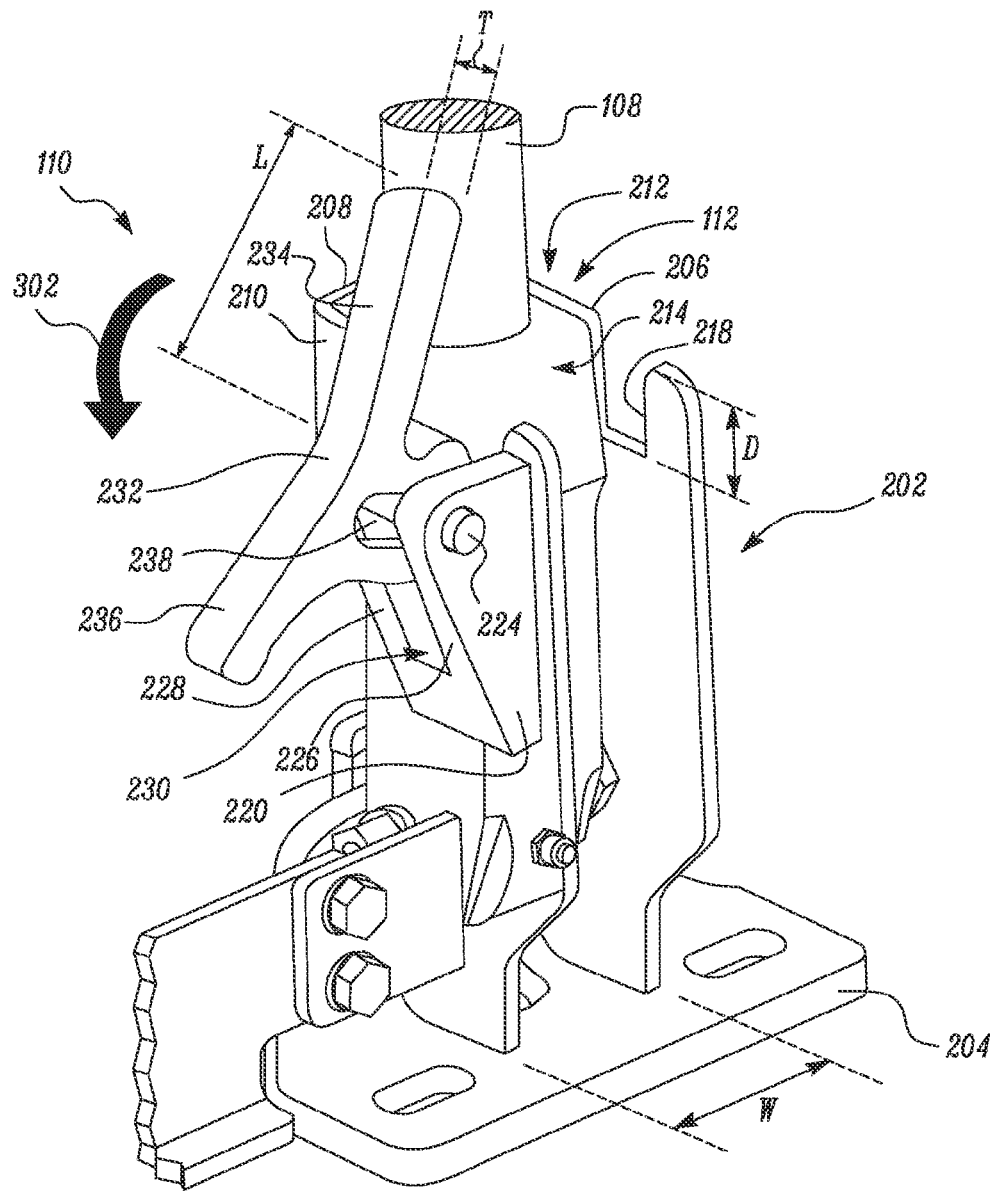
FIG. 3 is a perspective view of the locking mechanism depicting a working thereof.
Figure 4:
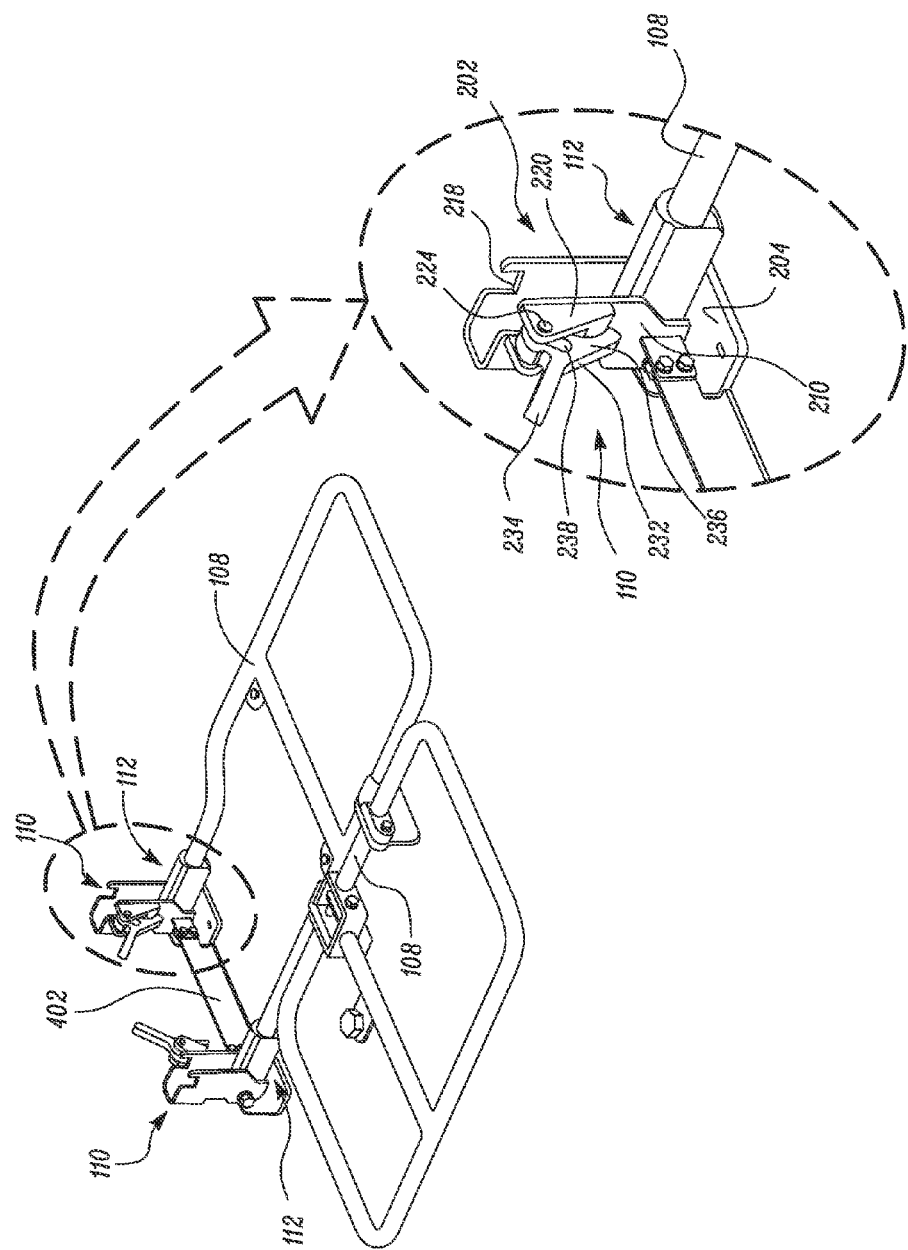
FIG. 4 is a perspective view of the handrail in a collapsed position.

Referring to FIG. 3, the locking member 232 may rotate about the pin 224 as shown by an arrow 302. As shown in FIG. 4, the locking member 232 may rest against the side surface 210 of the housing 202. The handrail 108 may move from the upright position to the collapsed position. As shown in the accompanying figures, the locking mechanism 110 may be provided at the base 112 of multiple handrails 108. A support arm 402 may extend between two adjacent locking mechanisms 110. The housing 202, the bracket 220 and/or the locking member 232 may be made from any metal known the art.

Figure 5:
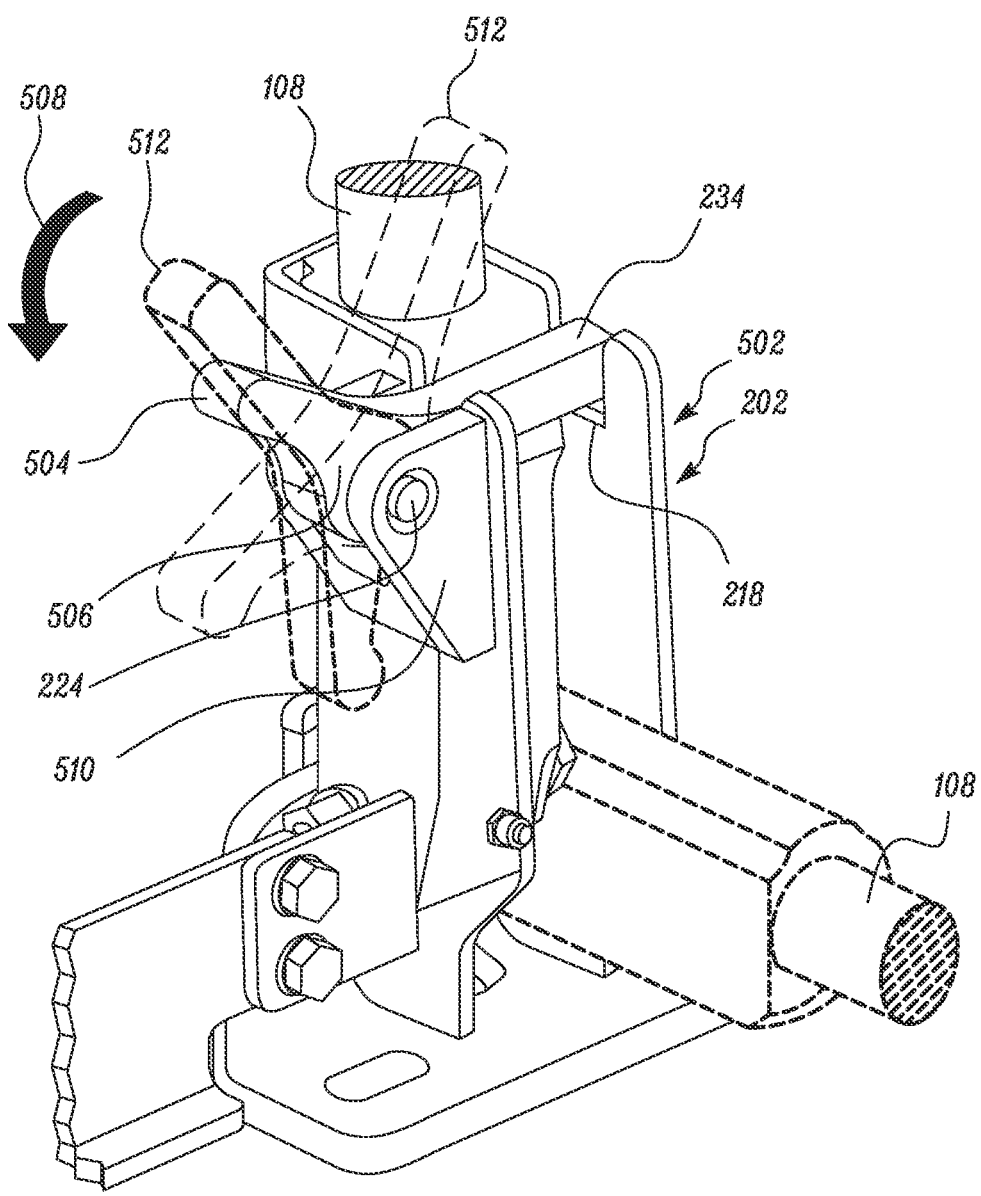
FIG. 5 is a perspective view of another configuration of the locking mechanism, according to various embodiments of the present disclosure.

FIG. 5 illustrates another design of the locking mechanism 502, according to various embodiments of the present disclosure. This locking mechanism 502 may be operated by a foot of the personnel. The second arm 504 of the locking member 506 is relatively longer than that of the locking member 232 shown in FIGS. 2 to 4. Further, the through hole provided on the locking member 506 is relatively smaller than that of the locking member 232. The bracket 510 is sized smaller than that of the bracket 220.

When the personnel steps on the second arm 504, a downward force is exerted on the second arm 504 causing the second arm 504 to rotate about the pin 224 along an arrow 508. The first arm 234 may be disengaged from the slots 218, as shown by dotted lines 512. Further, the handrail 108 may move from the upright position to the collapsed position.

It should be noted that during the operation of the machine 100, the handrails 108 are in the collapsed position. In an event that the first arm 234 gets engaged in the pair of slots 218 when the handrail 108 is in the collapsed position, the housing 202, the bracket 220, 510 and the locking member 232, 506 is designed in such a manner that when the handrails 108 are made to move from the collapsed position to the upright position, the first arm 234 of the locking member 232, 506 may automatically disengage from the slots 218 without any human intervention. Hence, the personnel may avoid manually disengaging the locking mechanism 110, 502 and accessing the platform 106 in a situation wherein the handrails 108 are in the collapsed position.

INDUSTRIAL APPLICABILITY

The present disclosure provides a robust locking mechanism for a low flat folding handrail. More particularly, the locking mechanism 110, 502 is attached to the platform 106 and hence allows for the handrails 108 to contact with the platform 106 when collapsed, thereby providing a compact design. This compact or low flat design may prevent impact of the handrail 108 with inner walls of the mine tunnel during operation of the machine 100. Further, when the handrails 108 are in the collapsed position, the visibility of the operator is not hindered. The collapsed handrails 108 may provide sufficient space for the operator or any other personnel to crawl thereover in situation of an evacuation.

The locking mechanism 110, 502 may either be operated by the hand or the foot of the operator. The locking mechanism 110, 502 is a cost effective and simple design which may be easily manufactured and installed. The locking mechanism 110, 502 may be utilized for a variety of applications and is not limited to that disclosed herein.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A locking mechanism associated with a handrail, the locking mechanism comprising:
   a housing configured to receive the handrail partially therein, the housing having a top open end configured to accommodate the handrail in an upright position, the housing having a side open end configured to accommodate the handrail in a collapsed position;
   a pair of slots provided on opposite side surfaces of the housing, wherein each of the side surfaces is adjacent to the side open end;
   a bracket affixed to any one of the side surfaces of the housing; and
   a locking member pivotally coupled to the bracket, the locking member comprising:
      a first arm configured to selectively engage with the pair of slots to retain the handrail in the upright position; and
      a second arm attached to the first arm, the second arm configured to selectively release the first arm from the pair of slots to allow the handrail to move from the upright position to the collapsed position.

\* \* \* \* \*